June 1, 1937.                C. C. KINKER                2,082,639
MACHINE FOR PRODUCING HOLLOW GLASS ARTICLES
           Filed Dec. 7, 1934           3 Sheets-Sheet 1
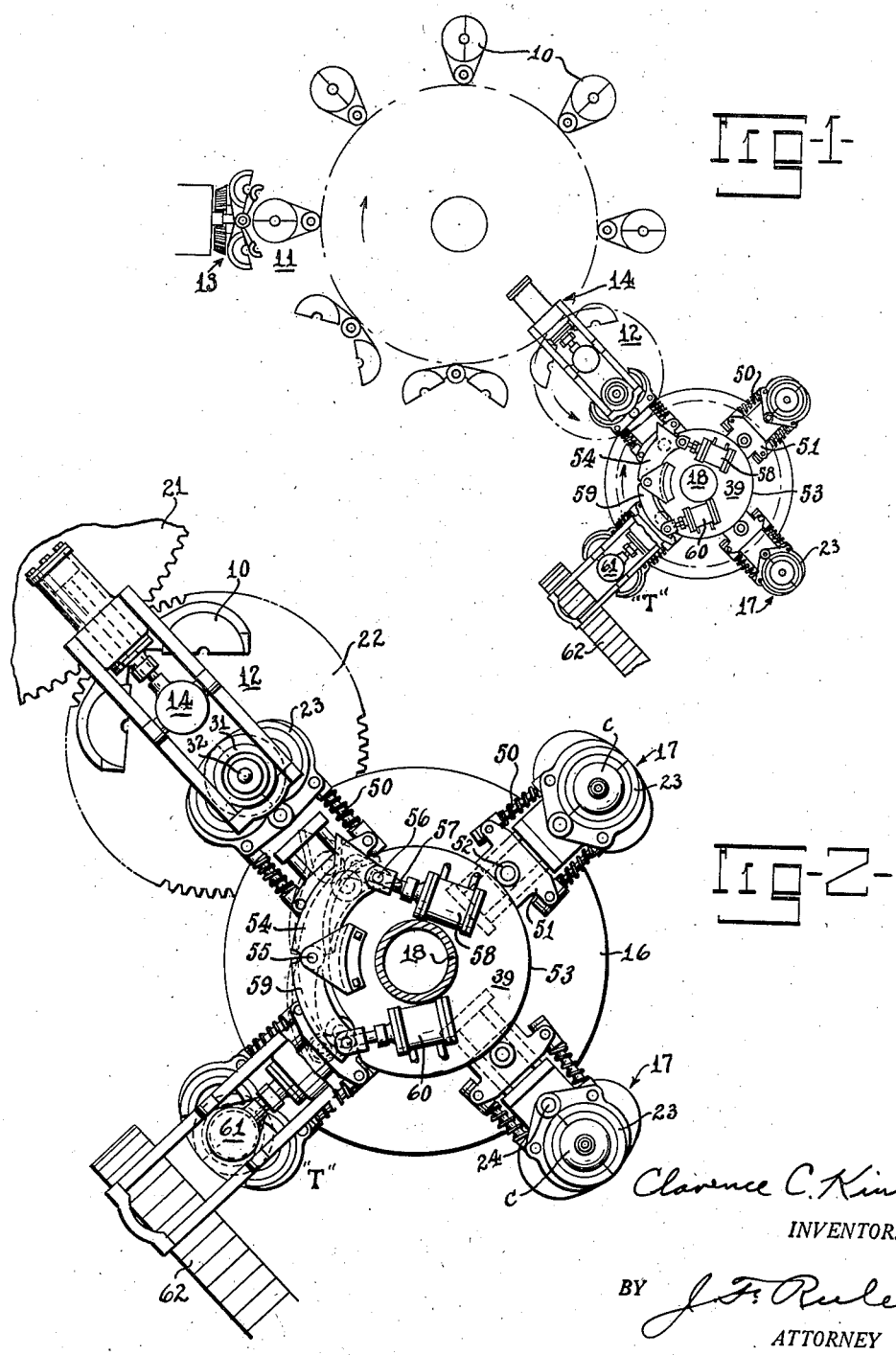

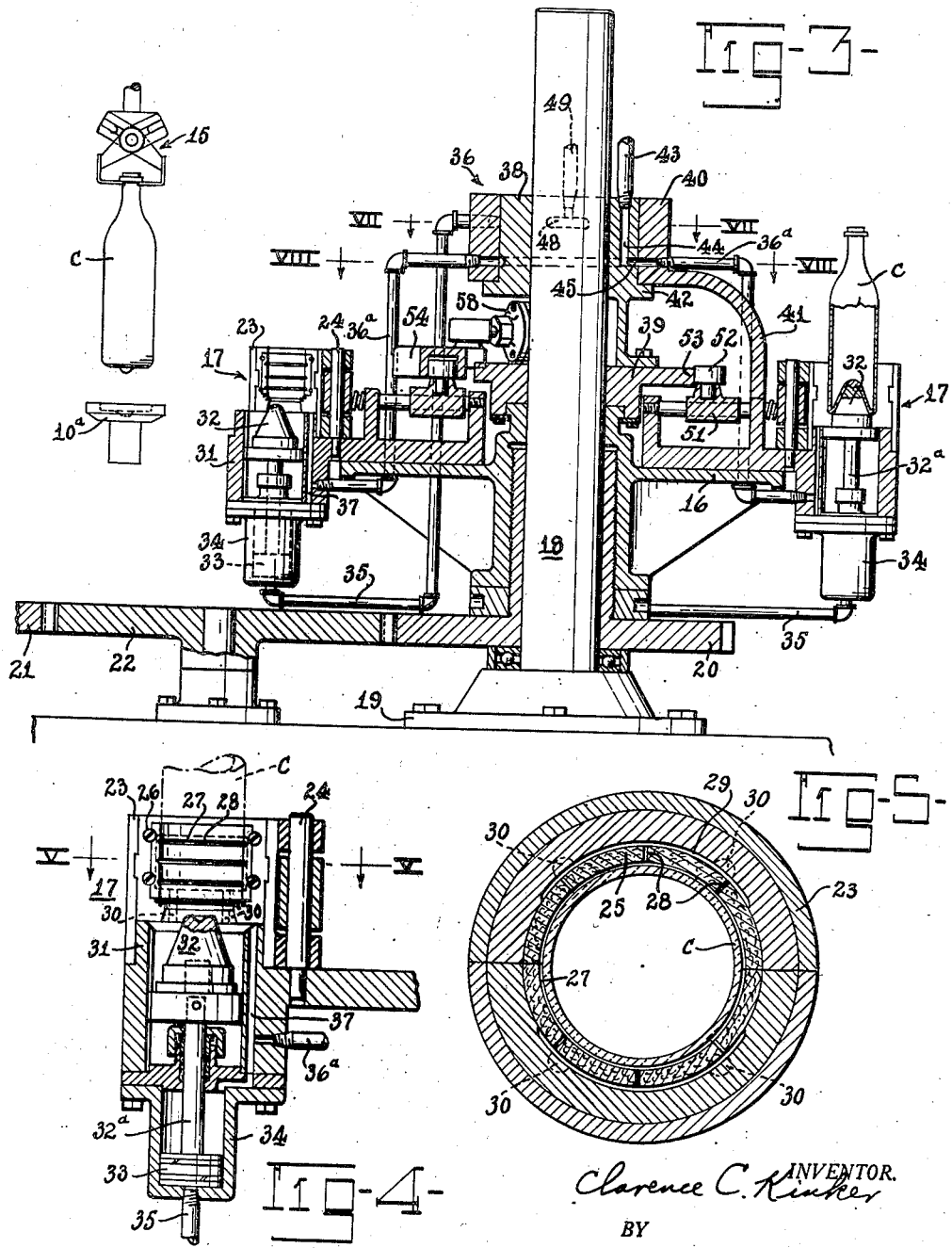

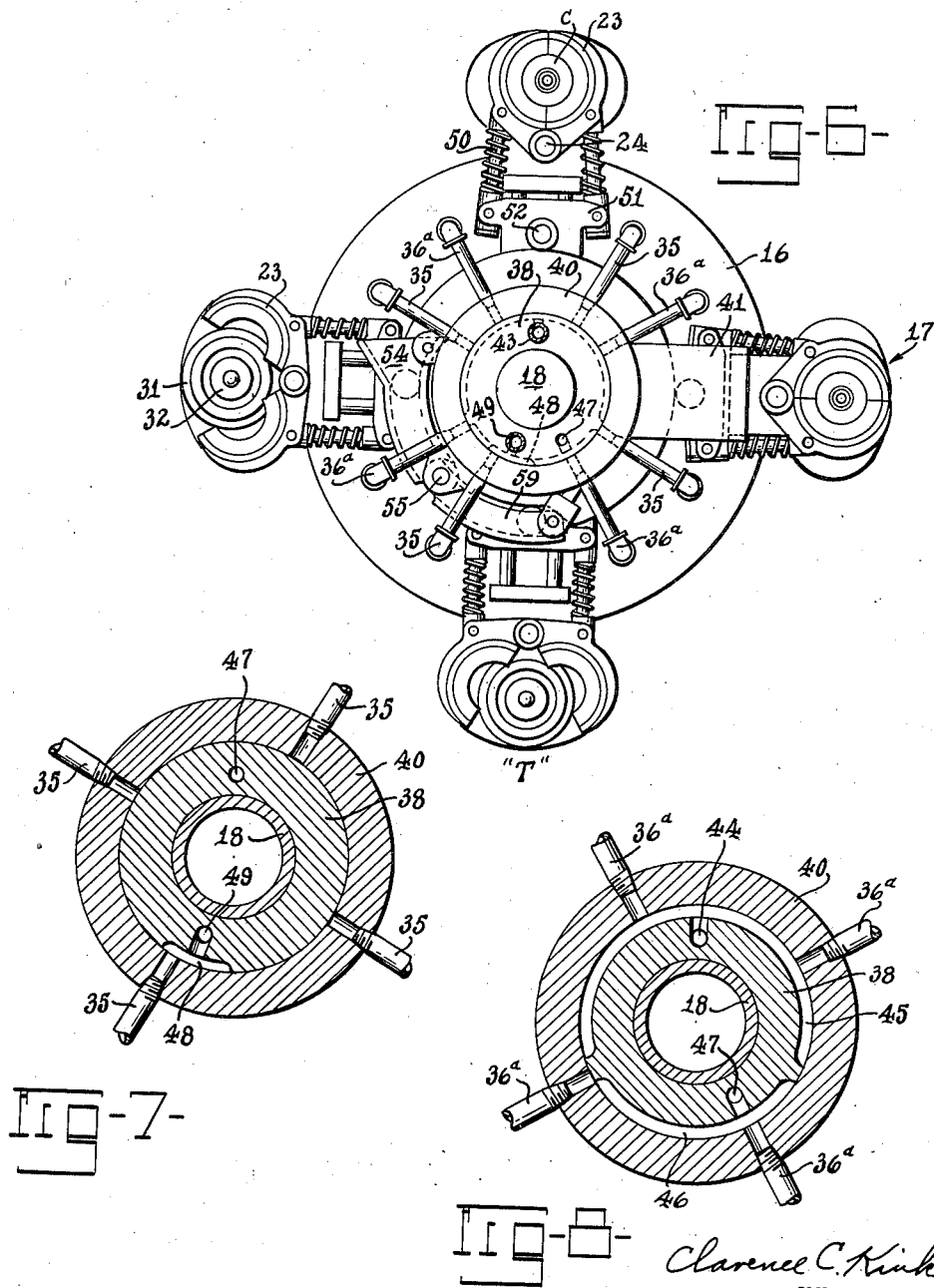

Patented June 1, 1937

2,082,639

UNITED STATES PATENT OFFICE 2,082,639

MACHINE FOR PRODUCING HOLLOW GLASS ARTICLES

Clarence C. Kinker, Alton, Ill., assignor to Owens-Illinois Glass Company, a corporation of Ohio Application December 7, 1934, Serial No. 756,440

5 Claims. (Cl. 49—1)

The present invention relates to improvements in machines for producing hollow glass articles such for example, as bottles and jars and more particularly to means for reshaping the bottoms of such containers.

An object of the present invention is the provision of a novel apparatus separate from the bottle forming machine, to which apparatus, the bottles or like containers are transferred from the forming machine and by means of which the bottoms of the containers are reshaped.

A further object of the invention is the provision of apparatus in which bottles are placed immediately upon removal from the forming machine and wherein a bottom former such for example, as a plunger, is adapted to be brought into engagement with the lower end of the containers for the purpose of forming push-up or re-entrant bottoms.

A further object of the present invention is the provision of novel container holders in which the containers are gripped by contraction of the holders and additionally secured against movement by the application of vacuum to said holders.

Other objects will be in part apparent and in part pointed out hereinafter.

In the drawings:

Fig. 1 is a plan view illustrating the present invention in connection with a bottle machine of the well known Lynch type.

Fig. 2 is a detail plan view with parts in section showing the apparatus for producing reentrant bottoms on the bottles and like containers and mechanism for transferring the articles from the forming machine to said apparatus.

Fig. 3 is a vertical sectional elevational view of the apparatus for producing reentrant bottoms.

Fig. 4 is a vertical sectional elevational view of one of the bottle holders and plungers.

Fig. 5 is a detail sectional view taken along the line V—V of Fig. 4.

Fig. 6 is a plan view.

Figs. 7 and 8 are sectional views taken along the lines VII—VII and VIII—VIII, respectively, of Fig. 3.

The present invention, while adaptable for use with various forms of bottle machines, is for illustrative purposes, shown in conjunction with one of the well known Lynch type machines. As disclosed in Figure 1, this bottle forming machine includes an annular series of finishing molds 10 and bottom plates 10a mounted for step-by-step rotation about a vertical axis, whereby they are brought in succession to a blank or parison transferring station 11 and an article discharging station 12. Blanks or parisons not shown, are removed from the blank mold unit 13 at the transferring station 11 and placed in the finishing molds. The blanks or parisons are expanded in these finishing molds and removed therefrom at the discharging station 12 by means of take-out mechanism 14 of conventional or any preferred form, such mechanism including tongs 15. These tongs are reciprocated along a horizontal path at the discharging station 12 where the expanded blanks are transferred to the bottom reshaping apparatus.

This apparatus in more or less general terms, includes an annular series of bottle holders, each having associated therewith, a bottom former, such for example, as a plunger, said holders and plunger being rotated in synchronism with the mold movements and adapted to operate upon the bottles while they are in a semi-plastic state and create therein, push-up or reentrant bottoms, such as are ordinarily formed in wine and champagne bottles. Specifically, the illustrated form of apparatus includes a carriage 16 supporting the container holders 17 and mounted for rotation upon a vertical stationary column 18 rising from a base 19. A gear 20 which is suitably attached to the carriage 16, is rotated in timed relation with movements of the molds 10 of the forming machine by means of a gear 21 constituting part of said forming machine and connected to said gear 20 by means of an intermediate idler gear 22.

Each container holder consists of a pair of gripping jaws 23, which are pivoted to a vertical pin 24 arising from the carriage 16. Each jaw 23 includes a lining 25 of formed asbestos or similar material designed for gripping engagement with the side surface of the bottles or other containers. Screws 26, or like fasteners, removably secure the lining in place. Each liner section includes a vertical series of horizontal grooves 27 on its inner face communicating by way of ports 28 with a vacuum chamber 29 formed between said liner section and the corresponding jaw 23. By means of conduits 30 communication is established between said chamber 29 and the open upper end of a cylinder 31 in which the bottom former 32 or plunger is mounted. By exhausting the air from the upper end of this cylinder 31, it is apparent that the air will likewise be exhausted from the chamber 29 and ports 28 and thereby assist the jaws 23 in securing the bottles against axial movement.

The bottom former 32, or plunger, which is mounted for vertical movement in the cylinder 31, is connected by means of a rod 32a to a piston 33, said piston being arranged in a vertical motor cylinder 34. A vacuum supply pipe 35 connects the lower end of said motor cylinder 34 and a vacuum distributing head 36 at the upper end of the central column 18. Through this pipe 35 the air is exhausted from beneath the piston 33 for the purpose of lowering the bottom former 32. A pipe 36a connecting said distributing head and the upper end of said motor cylinder 34, provides means whereby air may be exhausted from the upper end of said cylinder 34, for the purpose of projecting said bottom former upward into the bottle holder 17. A channel 37 in the wall of the cylinder 31 establishes communication between the motor cylinder 34, vacuum pipe 36a, and the chamber in which the bottom former 32 is disposed. Thus, vacuum is applied to the upper end of the motor cylinder 34 and the bottle holder 17 simultaneously, with the result that the bottle is firmly gripped and held against upward movement prior to and during projection of the bottom former or plunger.

The vacuum distributor 36, by means of which vacuum is applied to the upper and lower ends of the motor cylinder 34 in alternation, includes a stationary member 38 suitably attached to a stationary cam carrier 39. A collar 40 encircles said stationary member 38 and is connected to the carriage 16 by means of an arm 41. A radial flange 42 at the lower end of said stationary member 38, provides an upwardly facing shoulder which assists in supporting the collar 40.

The arrangement of ports and passageways in the distributor head is such that vacuum is applied to the upper end of the motor cylinder 34 during the entire period of reshaping of the container and to the lower end of said motor cylinder for a comparatively short period of time following such reshaping operation. To this end, a vacuum supply pipe 43 (Fig. 3) is connected to the stationary member 38 and communicating by way of a vertical passageway 44 (Fig. 8) with a vacuum chamber 45 in the form of an external chamber or groove partially encircling the stationary head member 38 near its lower end. A chamber 46 similar to the chamber 45 and spaced circumferentially from the ends of the latter, communicates with a port 47, through which air enters the pipe 36a and upper end of the motor cylinder 34. This construction provides for the application of vacuum to the upper end of the motor cylinder 34 during approximately 240° of each revolution of a holder and admission of outside air upon completion of the bottle reshaping operation.

Positive retraction of the bottom formers or plunger upon completion of the reshaping operation is insured through the provision of means for effecting a momentary application of vacuum to the lower end of the motor cylinders. The structure includes a short circumferential channel or groove 48 (Fig. 7) in the head member 38 connected to a conduit 49, leading to a source of vacuum supply. The other vacuum pipes 35 which are connected to the lower end of the motor cylinders 34 communicate one at a time with said channel 48, being brought into register therewith shortly in advance of arrival of the holder at the take-out station T.

Opening and closing of the holders 18 may be obtained by the following mechanism:

The jaws 23 of each holder are connected through links 50, to a slide block 51, which carries a cam roll 52 adapted for engagement with a stationary cam 53 formed at the outer margin of the carrier 39. This cam is of such shape that it locks the jaws of the holders together during their movement in a clockwise direction from a point adjacent the bottle discharging station 12 to the take-out station T. The holders are closed about the containers C by means of a motor operated lever 54, which is pivoted at one end to vertical hinge pin 55. This lever assumes somewhat the form of a box cam having its free end flared and connected by means of a pin 56 and rod 57 to a horizontal piston motor 58, said motor being mounted upon the stationary cam carrier 39. Operation of this motor at regular time intervals swings the cam lever 54 and due to its connection with the cam rolls 52, closes the holders about the containers C.

Opening of the holders preparatory to removing the completed articles therefrom at the take-out station T, is obtained by means of an arcuate cam lever 59 (similar to the lever 54) pivoted to the hinge pin 55 and connected at its free end to an air motor 60. This cam lever 59 is adapted to engage the cam rolls 52 as they move out of contact with the stationary cam 53 and immediately thereafter, impart radial inward movement thereto. Thus, the holders are opened. Take-out mechanism 61 similar, if not identical, to the take-out mechanism 14, may be employed to transfer the completed articles to a conveyor 62 or other receiver.

In view of the above, it is apparent that a complete cycle of operations may involve the usual bottle or jar forming steps and thereafter transfer of the bottles to the holders 17 which are closed about said bottles at the discharge station 12. It is understood that at this time the containers are in a more or less semi-plastic state and may be reshaped to a considerable extent without difficulty. The holders are brought into engagement with the containers at this station and immediately thereafter, vacuum is applied to said holders and simultaneously to the upper end of the piston motors 34. Thus, the bottom former 32 or plunger, is projected upwardly to reshape the lower end of the containers. Upon completion of the reshaping operation and/or arrival at the take-out station T, the holders are opened by means of the cam lever 59 and motor 60. The completed containers are then removed by means of the take-out mechanism 61.

Modifications may be resorted to within the spirit and scope of the appended claims.

What I claim is:

1. In apparatus of the character described, the combination of a bottle holder consisting of a pair of expansible jaws, means for bringing the jaws into gripping engagement with the side surface of a bottle in said holder, a bottom former arranged for movement into engagement with and reshaping one surface of the bottle and means common to the bottom former and jaws for actuating said former and increasing the gripping action of the jaws.

2. In apparatus of the character described, the combination of a bottle holder consisting of a pair of expansible jaws, means for bringing the jaws into gripping engagement with the side surfaces of a bottle, a bottom former, a vacuum operated piston motor for actuating the bottom former and means whereby application of vacuum to the motor for bringing the former into engagement with the bottle increases the gripping effectiveness of the holder.

3. In apparatus of the character described, the combination of a bottle holder including a pair of jaws pivoted together, means for closing the jaws about a bottle and leaving at least the lower end exposed, suction means for increasing the holding effectiveness of the jaws, a bottom former and means for moving the bottom former into engagement with and reshaping the exposed lower end of the bottle.

4. In apparatus of the character described, the combination of a bottle holder, a bottom former, a source of vacuum supply, vacuum controlled means for bringing the bottom former into engagement with and reshaping a portion of a bottle in the holder and means adapted to cooperate with the vacuum controlled means for applying suction to the bottle engaging surface of said holder and thereby increasing the gripping action of the latter.

5. In apparatus of the character described, the combination of a carriage mounted for rotation about a vertical axis, an annular series of partible bottle holders on said carriage, said bottle holders having open lower ends, means for bringing the holders into engagement with bottles, means separate from the holders adapted to increase their gripping action, bottom formers individual to the holders and suction means common to the formers and holders for periodically bringing the bottom formers in registration with the lower ends of the holders simultaneously with increasing their gripping action.

CLARENCE C. KINKER.